Patented Apr. 1, 1924.

1,489,183

UNITED STATES PATENT OFFICE.

CHARLES WEIZMANN AND JOSEPH BLUMENFELD, OF LONDON, ENGLAND.

PRODUCTION OF TITANIC ACID.

No Drawing. Application filed May 17, 1923. Serial No. 639,676.

*To all whom it may concern:*

Be it known that we, CHARLES WEIZMANN, a subject of the King of Great Britain and Ireland, and residing at London, England, and JOSEPH BLUMENFELD, a citizen of the Russian Realm, residing at London, England, have invented certain new and useful Improvements Relating to the Production of Titanic Acid, of which the following is a specification.

This invention relates to the production of titanic acid free from iron.

The raw material—minerals—from which this is produced contains iron as, for example, ilmenite, which is the chief source of supply.

The present invention has for its object to obtain titanic acid free from iron in an improved and cheaper manner.

The principal features of the process are as follows:—

(*a*) Treating titaniferous ores or the like with sulphuric acid of about 70-90 per cent strength at temperatures of from about 150° to about 180° C., in proportion limited so as to leave some of the minerals unattacked.

(*b*) Extracting the cooled reaction mass with a limited quantity of water so that only about 15 per cent to 20 per cent of the iron goes into solution, this extraction being carried out in the presence of a reducing agent, preferably spongy iron.

(*c*) Recovering the sulphuric acid employed in the formation of the iron sulphate by extracting the residue with water, recrystallizing and distilling.

(*d*) Washing the hydrated titanic acid precipitated by hydrolysis from (*b*) under reducing conditions as by washing with water acidulated with $H_2SO_4$ preferably with the addition of small quantities of a reducing agent, e. g., say salts of trivalent titanium, thus preventing oxidation of the mother liquor.

(*e*) Calcining the titanium hydroxide under oxidizing conditions to prevent the formation of lower oxides of titanium and ensure whiteness of the final product, for example by blowing the air through the mass or container.

In carrying this invention into effect in one form by way of example, the titaniferous ore, for example ilmenite, which is practically titanate of iron, $TiO_3Fe$, is treated with sulphuric acid having a concentration not greater than 90 per cent $H_2SO_4$. The ore containing say 45% to 50% of $TiO_2$ is heated with the acid to a temperature of about 170° C. The quantity of sulphuric acid is so calculated that the acid is not substantially in excess of the theoretical amount, and preferably there is always present an excess of the titaniferous material. As the reaction proceeds, the temperature tends to rise as heat is evolved, but when the heat evolution has more or less ceased, the temperature should be maintained, say, between 180° C. and 200° C. for a suitable time to complete the reaction period, say about 1½ hours, as although the mass has become what appears to be a dry powder, the reaction continues for some time, when the temperature is maintained.

The solid mass resulting from the sulphuric acid treatment consists of a mixture of ferrous and ferric sulphates, and mainly sulphates of titanium, titanyl sulphate and mineral which has not been attacked, and it is allowed to cool to atmospheric temperature. This mass is then treated with water added little by little at a temperature not exceeding 50° C. up to the quantity permissible without appreciable solution of the iron sulphates.

It is necessary to use only such a limited quantity of water in order to leave the bulk of the sulphates of iron undissolved. Preferably such an amount of water is used as to form a 20% solution of $TiO_2$ (as sulphate).

It is a well-known fact that the salts of trivalent iron are liable to become hydrolyzed and easily form colloidal solutions (pseudo solutions) or colloidal precipitates, and this is to be avoided.

To avoid this difficulty resulting from the character of ferric salts, it is preferable to effect the separation of the concentrated solution of titanyl sulphate from the reaction mass only after a complete reduction of the ferric salts has been effected. This reduction can be effected through various well-known reducing agents, but particularly good results are obtained by the use of spongy iron, which is added with stirring. This form of iron permits the reduction to be made in a very short time at ordinary temperature. The reduction can be considered complete when the solution changes in colour to a brown-violet, which indicates the formation of trivalent titanium. At this stage filtration can be effected without any disadvantage.

In one example a mineral having an original ratio of $TiO_2$ to $FeO$ of about 1.11 to 1 gave a solution in which this ratio had become about 6 to 1. This ratio may vary according to the mineral treated and the quantity of water used to dissolve the mass resulting from the mineral after treatment with sulphuric acid. The sulphate of iron mixed with the mineral not attacked can be easily separated by simply dissolving, filtering and re-crystallizing. The sulphate is thus produced in a very pure state and may be utilized directly, or the sulphuric acid may be recovered either by distillation of the iron sulphate or by converting it into some other sulphates, such as $Na2SO_4$, or $BaSO_4$, or in any other way. The primary solution separated by filtration or decantation as above which contains about 20 per cent of $TiO_2$ (namely in the form of the basic sulfate) must be treated for the complete separation of iron from the titanium. This is effected by hydrolyzing the titanic solution in any known manner.

The titanium hydroxide precipitate obtained by hydrolysis after decantation must be very carefully washed in order to eliminate completely the mother liquor containing iron. The first washings should be effected with special precautions so as to prevent the possibility of oxidizing the divalent iron salts contained in the mother liquor. With this in view it has been found that the addition of small quantities of trivalent titanium salts to the water used for washing (traces are sufficient), which water is also acidulated with sulphuric acid, gives good results. Washing is continued until the wash water gives no reaction for iron.

The presence of organic substances in the precipitate of titanic hydroxide can be a very serious danger with regard to the colour of the final product. In this case at the temperature of calcination it has been found that a certain reduction of $TiO_2$ to $Ti_2O_3$ occurs, and the trace of $Ti_2O_3$ darkens to some extent $TiO_2$. The calcination must be effected under oxidizing conditions to prevent the above reduction by blowing through air at a suitable temperature.

Titanic acid obtained by taking the aforesaid precautions is a white substance which when calcined at a temperature of 850° C. to 900° C. becomes a sulphur colour, but on cooling this yellow colour disappears.

We claim:—

1. A process for the extraction of titanium compounds from their ores, comprising treating the ore with sulphuric acid of 70–90 per cent concentration at a temperature of about 150° to 180° C., maintaining the temperature till the reaction is practically complete, cooling and extracting the titanyl sulphate under sufficiently powerful reducing conditions to reduce all dissolved ferric salts to ferrous salts and with only enough water to produce a solution having a $TiO_2$ content of about 20%.

2. A process for the extraction of titanium compounds from their ores, comprising treating the ore with sulphuric acid of 70–90 per cent concentration at a temperature of about 150° to 180° C., maintaining the temperature till the reaction is practically complete, cooling and extracting titanyl sulphate by the use of quantities of water limited so as to leave the bulk of the iron sulphates undissolved in the presence of a finely divided iron as a reducing agent, and separating the filtrate.

3. A process for the extraction of titanium compounds from their ores, which comprises treating the ore with such a quantity of sulphuric acid, of a concentration not exceeding 90 per cent, as to avoid rendering the entire quantity of the mineral soluble, at a temperature of about 150 to 180° C., maintaining said temperature until the reaction is practically complete, cooling and extracting the titanyl sulphate with only enough water to produce a solution having a $TiO_2$ content of about 20%, and under sufficiently powerful reducing conditions to reduce all dissolved ferric salts to ferrous salts.

4. A process for the extraction of titanium compounds from their ores, comprising treating the ore with sulphuric acid of 70–90 per cent concentration at a temperature of about 150 to 180° C., maintaining the temperature till the reaction is practically complete, cooling and extracting with water limited in quantity so as to leave the bulk of the iron sulphates undissolved, then separating titanyl sulphate in concentrated solution from the undissolved residue, the amount of water used in the extraction operation being not substantially more than four parts, per one part of $TiO_2$ in the acid-treated ore.

5. A process for the extraction of titanium compounds from their ores, comprising treating the ore with sulphuric acid of 70–90 per cent concentration at a temperature of about 150 to 180° C., maintaining the temperature till the reaction is practically complete, cooling and extracting with water of no greater amount than is necessary to produce a solution of about 20% TiO$_2$ content, thereby leaving a large part of iron sulphates undissolved, then separating titanyl sulphate in such concentrated solution from the undissolved residue, precipitating titanium hydroxide by hydrolysis and washing the precipitate under conditions preventing the oxidation of the divalent iron salts present.

6. A process for preparing titanic acid from titaniferous ores, comprising treating the ore with sulphuric acid of 70–90 per cent concentration at a temperature of about 150 to 180° C., maintaining the temperature till the reaction is practically complete, cooling, extracting with water limited in quantity so as to leave the bulk of the iron sulphates undissolved, then separating titanyl sulphate in concentrated solution from the undissolved residue, precipitating titanium hydroxide by hydrolysis and washing the precipitate under conditions preventing the oxidation of the divalent iron salts present and calcining the hydrated titanic oxid under ozidizing conditions.

7. A process of extracting titanium compounds from their ores, which comprises treating the ore with sulphuric acid of 70 to 90% strength, at a temperature of about 150 to 180° C., maintaining the temperature until the reaction is practically complete, cooling, and extracting the titanyl sulphate, under sufficiently powerful reducing conditions to reduce all of the dissolved ferric salts to ferrous salts, and with only enough water to produce a solution having a TiO$_2$ content, of about 20%.

In testimony whereof we have signed our names to this specification.

CHARLES WEIZMANN.
JOSEPH BLUMENFELD.